US010188906B2

(12) United States Patent
Haas

(10) Patent No.: US 10,188,906 B2
(45) Date of Patent: Jan. 29, 2019

(54) BALANCE REHABILITATION FOR UPPER-EXTREMITY TARGET TASKS

(71) Applicant: Shane Haas, Lubbock, TX (US)

(72) Inventor: Shane Haas, Lubbock, TX (US)

( * ) Notice: Subject to any disclaimer, the term of this patent is extended or adjusted under 35 U.S.C. 154(b) by 306 days.

(21) Appl. No.: 15/143,536

(22) Filed: Apr. 30, 2016

(65) Prior Publication Data

US 2016/0317870 A1 Nov. 3, 2016

Related U.S. Application Data

(60) Provisional application No. 62/156,224, filed on May 2, 2015.

(51) Int. Cl.

| | |
|---|---|
| ***G09B 19/00*** | (2006.01) |
| ***A63B 26/00*** | (2006.01) |
| ***A63B 17/04*** | (2006.01) |
| *A63B 22/18* | (2006.01) |
| *A63B 22/00* | (2006.01) |
| *A61H 1/00* | (2006.01) |

(52) U.S. Cl.

CPC ............ *A63B 26/003* (2013.01); *A63B 17/04* (2013.01); *A61H 1/005* (2013.01); *A61H 2203/0406* (2013.01); *A63B 22/18* (2013.01); *A63B 2022/0094* (2013.01); *A63B 2208/0204* (2013.01); *A63B 2208/0228* (2013.01); *A63B 2209/02* (2013.01); *A63B 2210/50* (2013.01); *A63B 2225/09* (2013.01)

(58) Field of Classification Search

USPC ................ 434/247, 258, 259, 260; 446/227; 482/44, 138, 148, 910; 601/23, 24, 33

See application file for complete search history.

(56) References Cited

U.S. PATENT DOCUMENTS 3,693,265 A * 9/1972 Alexander ............... A61B 5/18 33/512
3,752,144 A * 8/1973 Weigle, Jr. ........... A61B 5/1107 600/587
4,895,543 A * 1/1990 Vermette ................ A63H 33/04 446/105
5,265,589 A * 11/1993 Wang ..................... A63B 23/00 434/258
5,403,190 A * 4/1995 Wickstrom .............. A61B 5/16 434/258
5,490,517 A * 2/1996 Whitman ............... A61B 5/107 33/511
5,645,078 A * 7/1997 Marmer ................. A63B 23/12 600/595
5,839,991 A * 11/1998 Hall ....................... A63B 23/00 482/23

(Continued)

*Primary Examiner* — Kurt Fernstrom

(74) *Attorney, Agent, or Firm* — The Compton Law Firm, P.C.; Scott D. Compton

(57) ABSTRACT

A balance rehabilitation apparatus for upper-extremity target tasks of a person including a support framework and position-adjustable platforms attached to the support framework. The position-adjustable platforms may be loosed, relocated, and fixed along the support framework as desired to manipulate the level of difficulty of the balance rehabilitation exercises performed by a person or persons. The apparatus is operationally configured so that persons may perform rehabilitation exercises when standing, sitting or kneeling.

16 Claims, 7 Drawing Sheets

(56) References Cited

U.S. PATENT DOCUMENTS

| | | | | |
|---|---|---|---|---|
| 7,309,303 | B1 * | 12/2007 | Proctor | A63B 3/00 482/121 |
| 8,678,829 | B2 * | 3/2014 | Manfre | A63B 17/00 434/258 |
| 9,272,172 | B2 * | 3/2016 | Choppla | A63B 3/00 |
| 2006/0134589 | A1 * | 6/2006 | Goodwin | G09B 23/28 434/259 |
| 2012/0295239 | A1 * | 11/2012 | Gabara | G09B 19/0038 434/258 |

* cited by examiner

BALANCE REHABILITATION FOR UPPER-EXTREMITY TARGET TASKS

CROSS-REFERENCE TO RELATED APPLICATIONS

This application claims the benefit of priority from U.S. Provisional Application Ser. No. 62/156,224, filed May 2, 2015, which is incorporated by reference herein in its entirety.

STATEMENT REGARDING FEDERALLY SPONSORED RESEARCH OR DEVELOPMENT

Not Applicable

FIELD OF THE INVENTION

The invention relates generally to balance rehabilitation of persons.

BACKGROUND OF THE INVENTION

Balance is the ability of a person to remain steady in a standing or sitting position without a significant reliance on postural strategies or external support. Balance may be diminished by injury, aging, disease, disuse, or a combination thereof. When balance becomes limited, medical professionals or rehabilitation professionals such as physical and occupational therapists provide interventions to restore or otherwise improve the balance of a target patient.

Many devices and methodologies exist for use in balance exercise and rehabilitation. Known devices operate by either (1) having a patient stand on an unstable surface, e.g., foam, discs, wobble boards, vibration platforms, or (2) attempt to minimize body movements during the performance of balance exercises. What is missing is a device that challenges upper-extremity target tasks that use the arms and hands to reach, grasp, place, retrieve, deliver, and/or touch items at a particular location. For example, reaching to grasp and retrieve a cup to deliver and place it on a table is an upper-extremity target task. In a rehabilitation setting, reaching to grasp and retrieve a cone, delivering and placing it on a target, such as a platform, is an example of an upper-extremity target task. A device that would incorporate upper-extremity target tasks would help simulate functional challenges to balance. Functional activities are those common to daily life, such as, preparing meals, showering, dressing, and house cleaning. Functional balance is the ability to maintain balance during activities of daily living. Functional movements result in body weight shifts, postural instability, and balance challenges. Poor responses to the balance challenges of functional movements can lead to falls. Systems, apparatuses and methods are needed that progressively challenge a person's balance through the incorporation of upper-extremity target tasks. Systems, devices and methods are also needed that can be used to rehabilitate balance for patients sitting, kneeling and standing through the incorporation of upper-extremity target tasks.

SUMMARY OF THE INVENTION

The present application is directed to a balance rehabilitation apparatus including a support system defining a workspace for one or more persons; and one or more position-adjustable platforms releasably attachable to the support system; wherein the support system provides a plurality of positions or locations for securing the platforms thereto.

The present application is also directed to a method of rehabilitating a balance impaired person including (a) providing the apparatus as described in paragraph 0006 above, (b) for a target person to use the apparatus, placing the one or more position-adjustable platforms along the support system at first target locales or locations, (c) placing one or more target objects atop the one or more position-adjustable platforms; (d) placing the target person within the workspace facing a desired direction, the torso of the person being a distance from each of the one or more position-adjustable platforms; and (e) having the target person manually grab and move one or more target objects to and from one or more position-adjustable platforms using at least one of his/her upper extremities.

The present application is also directed to a system for affecting the focus and degree of difficulty of one or more balance exercises to be performed by a person using upper-extremity target tasks, including (a) a balance rehabilitation apparatus including (1) a support system defining a workspace for one or more persons; and (2) one or more position-adjustable platforms releasably attachable to the support system, wherein the support system provides a plurality of positions for securing the platforms thereto; and (b) one or more target objects to rest atop the one or more position-adjustable platforms, the one or more target objects being moveable amongst one or more position-adjustable platforms.

BRIEF DESCRIPTION OF THE SEVERAL VIEWS OF THE DRAWING

In order to describe the manner in which the above-recited and other advantages, method, and features of the present invention cab be obtained a more particular description of the invention will be rendered by reference to specific embodiments which are illustrated in the appended drawings. Understanding that these drawings depict only typical embodiments of the invention and are not therefore to be considered to be limiting in scope, the invention will be described and explained with additional specificity and detail through the use of the accompanying drawing in which.

DETAILED DESCRIPTION OF THE INVENTION

Figure 1:
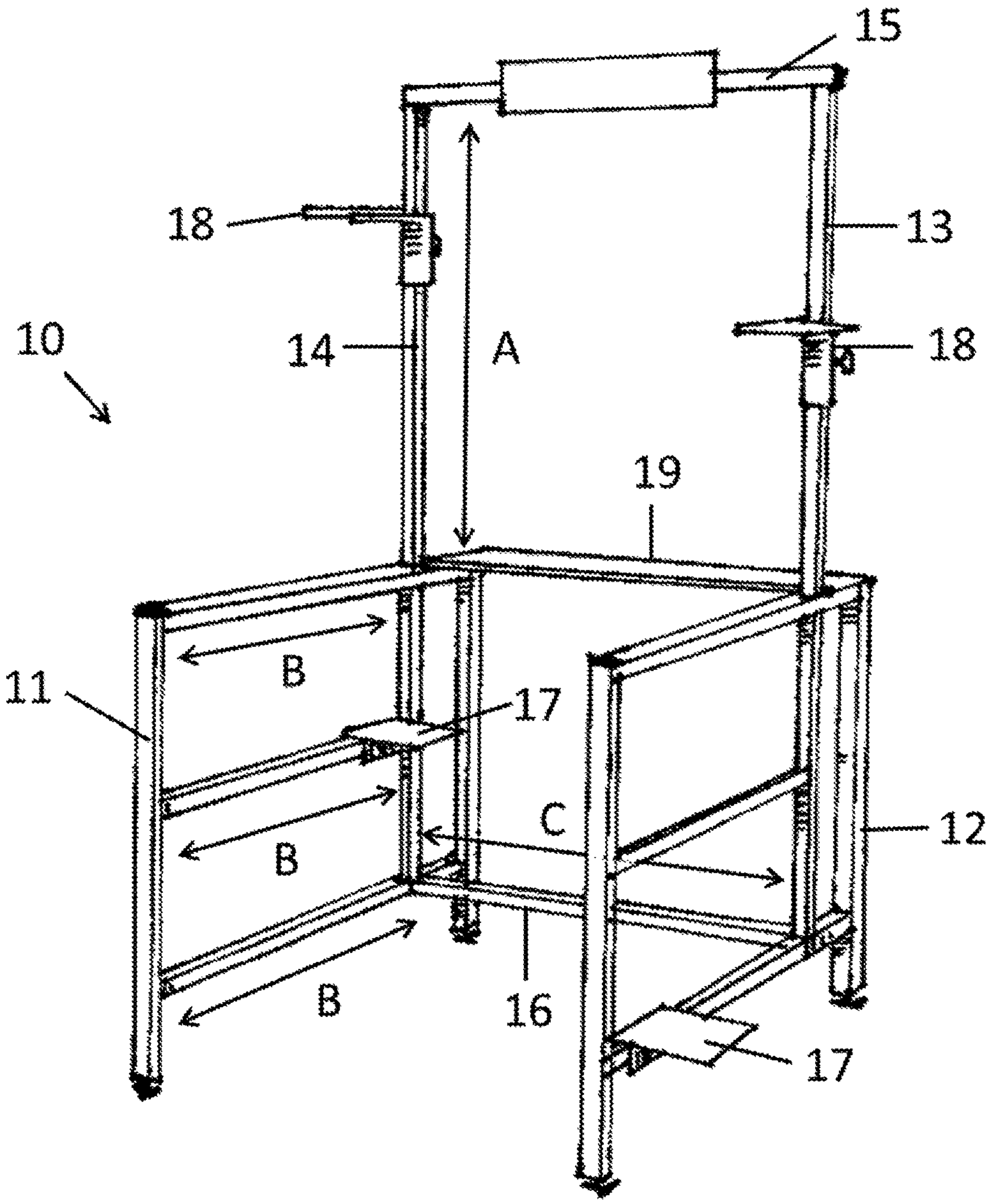
FIG. 1 is a perspective view illustrating an exemplary embodiment of the balance rehabilitation apparatus for upper-extremity target tasks in accordance with the present invention.

The present invention extends to balance rehabilitation and more particularly to a balance rehabilitation apparatus for upper-extremity target tasks that utilizes position-adjustable platforms on a support system to progressively challenge the user to maintain balance.

Before describing the invention in detail, it is to be understood that the present system, device and method are not limited to particular embodiments. It is also to be understood that the terminology used herein is for the purpose of describing particular embodiments only, and is not intended to be limiting. As used in this specification and the appended claims, the term "rehabilitation" refers the process of improving a person's diminished balance over time. The phrase "health care professional" refers to a person trained in the rehabilitation of balance disorders. The term "patient" refers to a person being rehabilitated using the system, apparatus and method of the present application. The term "balance" refers to a state of equilibrium or parity in an individual characterized by cancellation of all forces by equal opposing factors enabling a person to remain upright and/or steady. The term "upper-extremity" refers to the arm of a person including the shoulder, arm, elbow, forearm, wrist and hand. The term "lower extremity" refers to the "leg" of the person including the hip, thigh, knee, calf, ankle and foot.

In one aspect, the application provides a system, apparatus and method for improving balance through the use of upper-extremity target tasks, rather than by standing on unstable surfaces or attempting to minimize body movements during the performance of balance exercises.

In another aspect, the application provides a system, apparatus and method for balance rehabilitation and/or balance improvement or enhancement using upper-extremity target tasks.

In another aspect, the application provides a balance rehabilitation apparatus for upper-extremity target tasks.

In another aspect, the application provides a balance rehabilitation system, apparatus and method for upper-extremity target tasks comprising a plurality of position-adjustable platforms to be secured on at least one support member of the apparatus. Each of the position-adjustable platforms may include a suitable perimeter shape as desired, e.g., (1) multi-sided (square, triangular, hexagonal, etc.), (2) curved (circular, oval, or the like). Such position-adjustable platforms may be loosed, repositioned or otherwise moved and fixed in place at one or more target locales of the apparatus to affect the focus and degree of difficulty of one or more balance exercises to be performed, where the degree of challenge to balance can be changed to meet the rehabilitation needs of one or more users of the system and apparatus.

In another aspect, the application provides a balance rehabilitation system, apparatus and method including a plurality of position-adjustable platforms that may be loosed, repositioned or otherwise moved and fixed in place at one or more target locales of the apparatus such that position-adjustable platform locations utilized correspond to the balancing ability of a particular user. For example, in one embodiment the position-adjustable platforms may be located near the user with larger balance deficits. In another embodiment, the positional-adjustable platforms are located further away from the user with small balance deficits. The position-adjustable platforms can loosed, repositioned or otherwise moved and fixed in place at one or more target locales of the apparatus and progressively moved further away from a user, increasing the challenge to balance, as a user's balance improves over time.

In another aspect, the application provides a balance rehabilitation system, apparatus and method including a plurality of position-adjustable platforms that may be loosed, repositioned or otherwise moved and fixed in place at one or more target locales of the apparatus such that the position-adjustable platforms are located on one side of the support apparatus for users with increased need to perform hand-directed tasks to one side, e.g., as a stroke patient with unilateral neglect.

In another aspect, the application provides a balance rehabilitation system, apparatus and method including a plurality of position-adjustable platforms that may be loosed, repositioned or otherwise moved and fixed in place at one or more target locales (1) to allow for standing balance rehabilitation of one or more users and/or (2) to allow for sitting balance rehabilitation.

In another aspect, the application provides a balance rehabilitation apparatus including a plurality of position-adjustable platforms that may be loosed, repositioned or otherwise moved and fixed in place and positioned to support one or more target objects thereon at one or more target locales utilizing a plurality of adjustment mechanisms including, but not necessarily limited to jam bolts, clamps, collars, pins, magnets, and combinations thereof.

In another aspect, the application provides a balance rehabilitation system, apparatus and method for balance rehabilitation for upper-extremity target tasks including a support apparatus.

In another aspect, the application provides a balance rehabilitation system, apparatus and method for balance rehabilitation for upper-extremity target tasks, the apparatus including a support system containing a plurality of support members oriented in horizontal, vertical, oblique, or any combination thereof, including, but not necessarily limited to linear and curvilinear orientations. In one implementation, the desired function of the support system is to provide a range of adjustability for securing and holding the position-adjustable platforms.

In another aspect, the application provides a balance rehabilitation system, apparatus and method that seeks to fulfill the need to improve balance rehabilitation by providing an apparatus that progressively challenges balance through the use of upper-extremity target tasks. The present invention also provides the ability to rehabilitate both sitting and standing balance through the use of upper-extremity target tasks. Additionally, traditional balance equipment like foam, discs, wobble boards, and vibration platforms can be incorporated into the present apparatus to further challenge a user's balance when performing upper-extremity target tasks.

This and further objects and advantages will be apparent to those skilled in the art in connection with the drawings and the detailed description of the embodiments set forth below.

The following description of the present invention utilizes a series of diagrams that illustrate the structure of a number of exemplary embodiments for implementing the present invention. Using the diagrams in this manner to present the invention is for illustration purposes only and should not be construed as limiting the scope of the present invention.

Referring now to the drawings wherein, like reference numerals refer to similar or identical parts throughout several views, FIG. 1 illustrates an exemplary embodiment of the balance rehabilitation apparatus 10 (hereafter "apparatus") for upper-extremity target tasks on which a user stands or sits in or around during use thereof. In simplified terms, the balance rehabilitation apparatus 10 includes a support system defining a framework providing a first side frame assembly, a second side frame assembly and a third side frame assembly disposed between the first and second side frame assemblies, wherein the height of the third side frame assembly may vary from the height of the first and second side frame assemblies as desired. The framework of the apparatus 10 suitably defines a workspace for a user of the apparatus 10. More particularly, the balance rehabilitation apparatus 10 includes a (1) support system defined by at least first side rails member 11, second side rails member 12, first upright 13, second upright 14, top bar 15, and bottom bar 16 and (2) position-adjustable platforms, e.g., a horizontal platform 17, vertical platform 18, and spanning platform 19. In operation, the user performs upper-extremity target tasks utilizing the adjustable and moveable position-adjustable platforms 17, 18, 19 that are operationally configured to be set along the support system in one or more target locales corresponding to the balance rehabilitation needs and abilities of a particular user. In other words, the support system 20 is operationally configured to reposition the platforms in mutually perpendicular X, Y, and Z directions along the support system 20 (see Directional Arrows A, B, C). Although the apparatus 10 of FIG. 1 is shown as being set to a particular size, in another embodiment it is contemplated that one or more of the above described parts of the support system 20 may include telescoping members with releasable pins and/or collars for adjusting the size of the support system 20. In addition, the support system 20 may include adjustable supports attachable along the bottom of the front and back upright members 11A, 11B, 12A, 12B for leveling the apparatus 10 upon a support surface such as an uneven floor as may be required.

Figure 2:
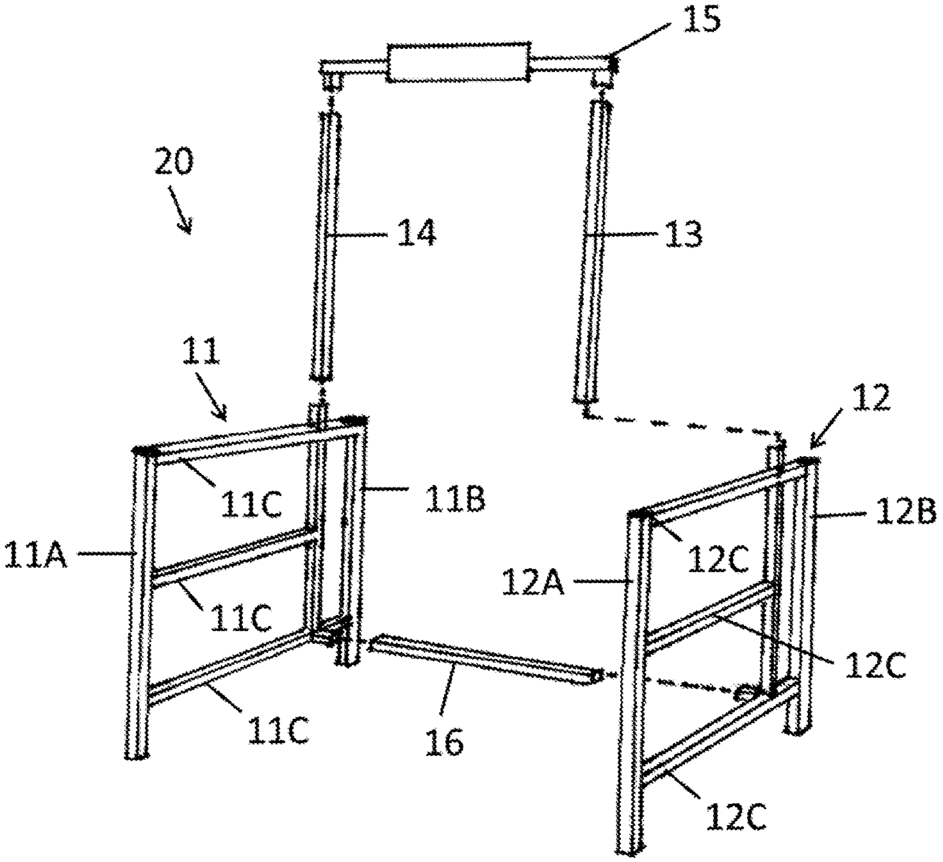
FIG. 2 is a perspective view illustrating an exemplary embodiment of the support system of the balance rehabilitation apparatus for upper-extremity target tasks in accordance with the present invention.

One exemplary support system 20 is shown in FIG. 2. In this embodiment, the support system 20 includes a plurality of support members, e.g., the first side rails member 11, second side rails member 12, first upright 13, second upright 14, top bar 15, and bottom bar 16. As shown, the individual members comprising the support system 20 include various elongated members defined by longitudinal axis that are interconnected in a manner effective to form a frame or framework of user support.

Suitably, the individual members of the support system 20 are connected in a manner effective to allow for easy assembly, disassembly, transport, and storage. In one embodiment, the distal ends of one or more members of the support system 20 may include releasable male/female fittings (see for example the connection between top bar 15 and the first and second uprights 13, 14). In another embodiment, the one or more members of the support system 20 may include intermediate joints providing male/female fittings. In still another embodiment, the one or more members of the support system 20 may be releasably joined via fasteners, including but not necessarily limited to clamps, collars, brackets, and combinations thereof. In another embodiment, the one or more members of the support system 20 may be joined in a manner effective to provide a fixed support system 20, e.g., via one or more adhesives, welds, providing a particular configuration of the support system 20. In still another embodiment, the support system 20 may be operationally configured so that two or more apparatuses 10 can be connected for simultaneous rehabilitation of multiple users making use of each individual apparatus 10. In another embodiment, it is contemplated that multiple users may use a single apparatus 10 simultaneously.

Still referring to FIG. 2, the first side rails member 11, second side rails member 12 suitably provide front and back upright members 11A, 11B, 12A, 12B and one or more horizontal members 11C, 12C. The embodiment of FIG. 2 includes three horizontal members for each of the rail members 11 and 12. As shown, the upright members may be provided in a parallel arrangement and/or the horizontal members may be provided in a parallel arrangement. It is also contemplated that the upright members and/or the horizontal members may be oriented in a non-parallel arrangement as desired. Nothing in the present invention requires the apparatus 10 necessarily be affixed to a particular support surface such as the floor or ground. The orientation of the support system 20 provides the apparatus 10 to be maintained in an upright position (see FIG. 1) during use. In another embodiment, the bottom of the first and second side rails members 11, 12 may be connected to a support surface as desired, e.g., brackets, cavities in a support surface for mating with the side rails members 11, 12.

Although the apparatus 10 may be built to scale, for suitable operation, the individual members comprising the support system 20 may include tubular or multi-sided members ranging in outer diameter from about 1.9 cm to about 8.9 cm (about 0.75 inches to about 3.5 inches). The first upright 13 and second upright 14 suitably include substantially similar lengths, although dissimilar lengths are herein contemplated. Without limiting the invention, a suitable length of the first upright 13 and second upright 14 may range from about 91.4 cm to about 121.9 cm (about 36.0 inches to about 48.0 inches). The top bar 15 suitably includes a length ranging from about 91.4 cm to about 121.9 cm (about 36.0 inches to about 48.0 inches). The front and back upright members 11A, 11B, 12A, 12B suitably include substantially similar lengths, although dissimilar lengths are herein contemplated. Without limiting the invention, a suitable length of the front and back upright members 11A, 11B, 12A, 12B may range from about 86.4 cm to about 96.5 cm (about 34.0 inches to about 38.0 inches). The one or more horizontal members 11C, 12C suitably include substantially similar lengths, although dissimilar lengths are herein contemplated. Without limiting the invention, a suitable length of the one or more horizontal members 11C, 12C may range from about 91.4 cm to about 127.0 cm (about 36.0 inches to about 50.0 inches).

In the embodiment of FIG. 2, the individual members of the support system 20 include four sided elongated members having a maximum outer diameter of about 3.8 cm (about 1.5 inches). In one exemplary embodiment, the individual members of the support system 20 may include square tubing that are releasably connected via male/female connections providing for ease of assembly, disassembly, transport, and storage. Many different support designs may be used from single support members to multiple support members, oriented in any number of ways. As stated above, the shape of the individual members of the support system 20 may also vary from square to circular to oval cross-sections of different size outer diameters.

The support system 20 may be constructed of any material durable enough for human use over time. In particular, the individual members of the support system 20 may be constructed from materials including, but not necessarily limited to those materials resistant to chipping, cracking, excessive bending and reshaping as a result of ozone, weathering, heat, moisture, other outside mechanical and chemical influences, as well as various impacts and other loads placed on the apparatus 10. Suitable materials of construction include, but are not necessarily limited to metals, plastics, rubbers, woods, fiberglass, plexiglass, filled composite materials, and combinations thereof. Suitable plastics include, but are not necessarily limited to vinyl polymers and polyvinyl chloride (PVC). Suitably metals include, but are not necessarily limited to aluminum, steel and titanium. Likewise, the support system 20 may comprise one or more outer coatings including any color or combination of colors. In the alternative, the support system 20 may be provided showing its materials of construction in natural form.

Figure 3:
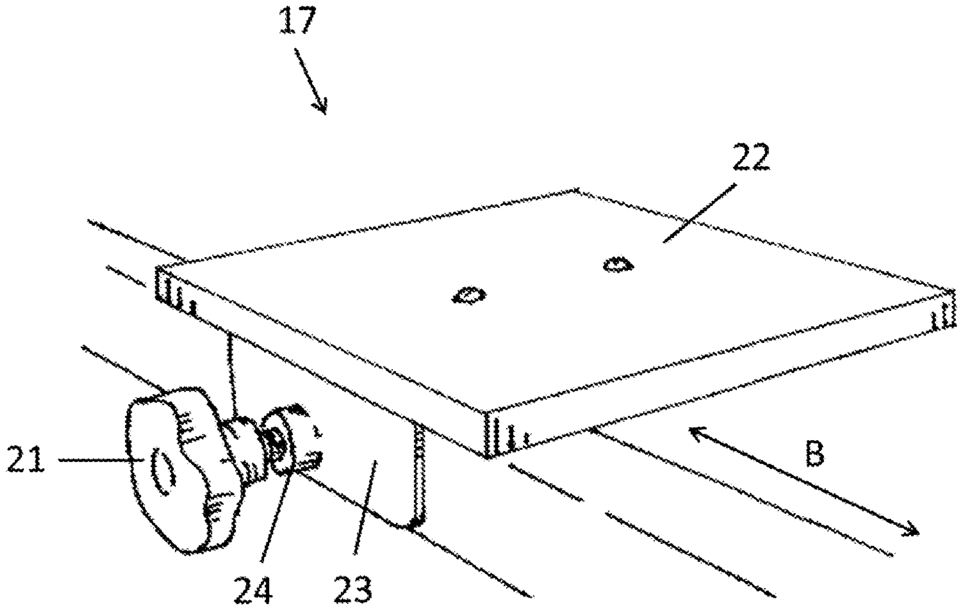
FIG. 3 illustrates an exemplary embodiment of the horizontal position-adjustable platforms for horizontally-oriented support members in accordance with the present invention.

FIG. 3 shows an exemplary horizontal position-adjustable platform 17 including a jam bolt 21 with a handle and elongated male member is used to tighten or loosen the position-adjustable platform 17 to and from the second side rails member 12 by mating with an aperture of the second side rails member 12 as understood by the skilled artisan. As shown, the position-adjustable platform 17 includes a platform 22 operationally configured for a user to place his/her hand or an object thereon. As shown, the platform 22 may include a planar type surface, but the platform 22 may include any non-planar surface as desired, e.g., curved surface, a surface having one or more cavities for receiving balls therein, a plurality of raised surfaces such as dimples or the like disposed along the surface of the platform 17.

The platform 17 is suitably attached to a connector 23 having planar surfaces including opposing inner surfaces for abutting opposite sides of the second side rails member 12. As shown, the connector 23 includes a U-shape design extending from the platform 17 forming right angles there with allowing the inner surface of the connector 23 and bottom surface of the platform 17 to abut the horizontal rail member 12C. As shown, the connector 23 includes an aperture operationally configured to receive and hold the jam bolt 21 there through allowing the platform 17 to be adjusted lengthwise along the horizontal rail member 12C (see Directional Arrow B in FIG. 3). Without limiting the invention, individual horizontal members 12C may include one or more apertures along the length of the members for receiving a pin type male member of the jam bolt 21 enabling the platform 17 to be held in one or more various locations along the length of each individual horizontal 12C during operation of the apparatus 10. In another embodiment, the jam bolt 21 may apply a force against the surface of the horizontal member 12C in a manner effective to maintain the platform 17 in a fixed position during use.

The platforms of this application may be constructed from like materials as described above in reference to the support system 20. In addition, the platforms of this application may include outer perimeter shapes as desired or otherwise required for one or more particular purposes. For example the platform 17 may include a multi-sided perimeter shape including, but necessarily limited to a triangular shape, pentagonal shape, hexagonal shape and a rectangular shape as shown in FIG. 3. One suitable platform 17 may include a square shape with a planar surface with sides measuring from about 7.6 cm to about 25.4 cm (about 3.0 inches to about 10.0 inches). Another suitable platform 17 may include a square shape with a planar surface with sides measuring from about 17.8 cm to about 20.3 cm (about 7.0 inches to about 8.0 inches).

Without limiting the invention, the platforms described herein may include a thickness as desired or otherwise required for one or more particular purposes. In one particular embodiment, the platforms (see platform 17 in FIG. 3) may include a thickness of about 1.3 cm (about 0.5 inches) constructed from one or more plastics, bolted to a formed steel connector 23, which is made from rectangular steel tubing welded to solid bent steel. Still referring to FIG. 3, a threaded bung 24 is welded to the outer surface of the connector 23, through which a threaded knob is inserted to function as a jam bolt 21 for the purposed of securing the platform 17 in place on the support system 20.

Figure 4:
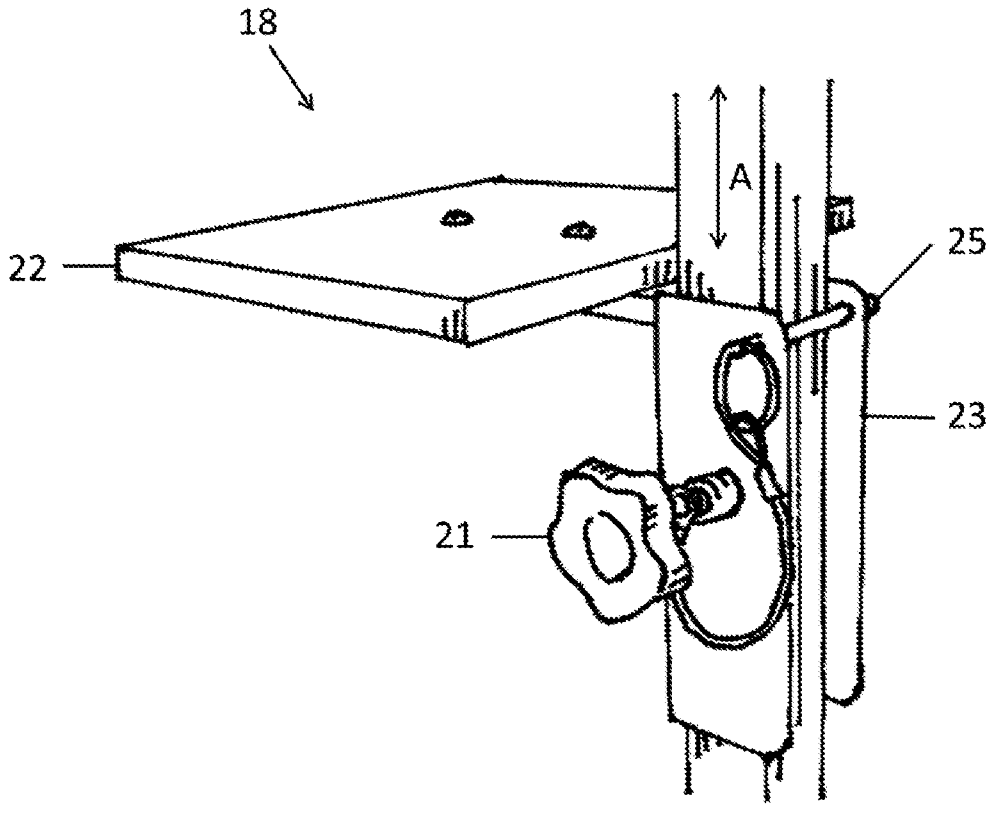
FIG. 4 illustrates an exemplary embodiment of the vertical position-adjustable platforms for vertically-oriented support members in accordance with the present invention.

FIG. 4. depicts an embodiment of a vertical position-adjustable platform 18 including a jam bolt 21 for tightening and loosening the platform 18 as desired. The platform 22 portion of the position-adjustable platform 18 may be constructed from plastic, attached to a formed steel connector 23 that allows for adjustability utilizing a jam bolt 21 similar as describe above and locking pins 25 that are inserted through holes in the platform base as shown. The locking pins 25 assist in maintaining the position-adjustable platforms in a fixed position with the first upright 13 or second upright 14 during use. The position-adjustable platforms may be connected to the support system 20 via other mechanisms besides locking pins 25 of FIG. 4. For example, the position-adjustable platforms may be connected to the support system 20 via connectors such as collars, springs or clamps allowing for adjustment of the platforms along the first and second uprights 13, 14 (see Directional Arrow A in FIG. 4).

Figure 5:
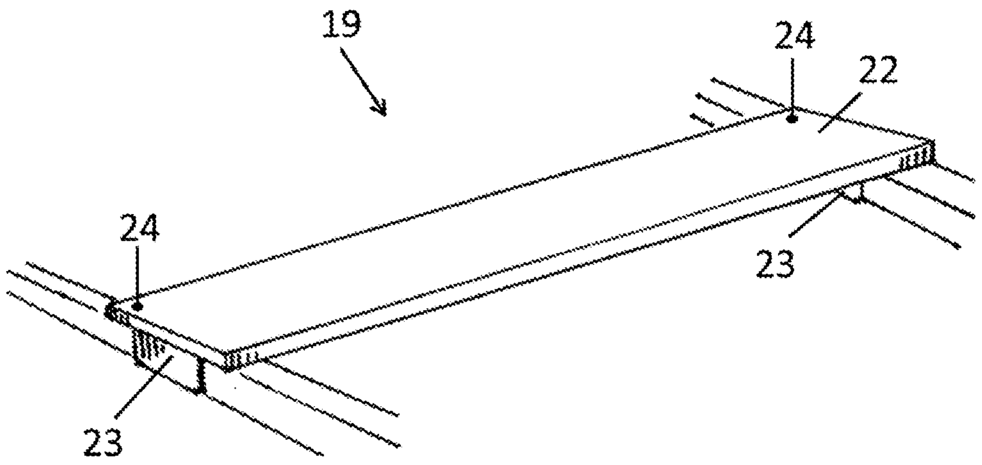
FIG. 5 illustrates an exemplary embodiment of the spanning position-adjustable platform.

FIG. 5 shows a simplified embodiment of a spanning position-adjustable platform 19 where the platform surface 22 portion of the position-adjustable platform 19 includes a substantially planar form. In one simplified embodiment, this particular platform 19 may be constructed from plastic and be attached to a formed steel connector 23 as described above. Locking pins (not shown) are inserted into the platform 22 through holes 24. As understood by the skilled artisan, the locking pins are operationally configured to maintain the position-adjustable platforms from coming apart from the first and second side rails 11, 12 during use. Position-adjustable platforms may be connected to the support system 20 many different ways other than via one or more locking pins. For example, other connectors such as collars, springs or clamps may be used. The spanning position-adjustable platform 19 can be loosed, moved, and secured a plurality of locales that allow for both sitting and standing balance rehabilitation. Suitable dimensions of an exemplary spanning position-adjustable platform 19 may include a length from about 91.4 cm to about 121.9 cm (about 36.0 inches to about 48.0 inches), a width from about 12.7 cm to about 30.5 cm (about 5.0 inches to about 12.0 inches) and a thickness of about from about 1.3 cm to about 2.5 cm (about 0.5 inches to about 1.0 inches). One particular spanning position-adjustable platform 19 may include a length of about 99.1 cm (about 39.0 inches), a width of about 25.4 cm (about 10.0 inches) and a thickness of about 1.3 cm (about 0.5 inches).

Figure 6:
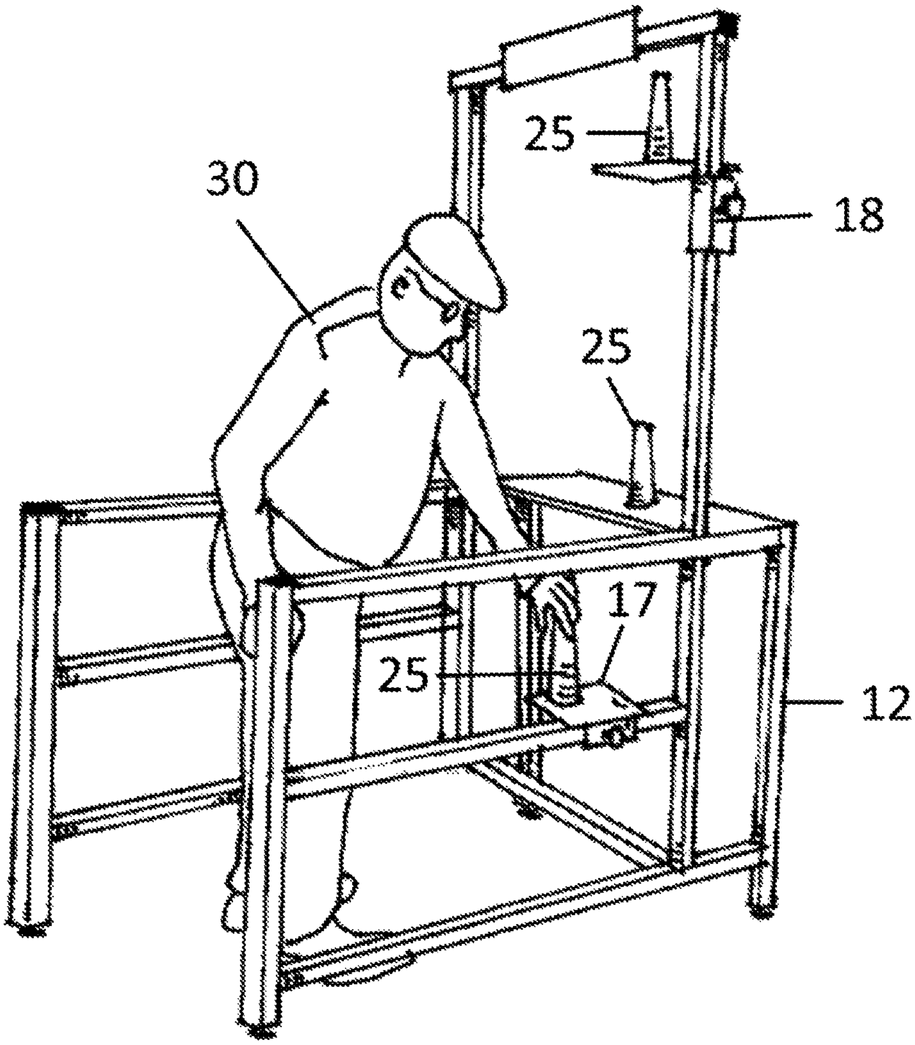
FIG. 6 illustrates another exemplary embodiment of the balance rehabilitation apparatus for upper-extremity target tasks including a user in a standing position.

An illustration of standing balance rehabilitation exercise is shown in FIG. 6, which depicts a user 30 in a standing position in the workspace defined by the support system 20 facing the spanning position-adjustable platform 19. As shown, the user 30 reaches across his body with his left hand to place a target object, shown here as a cone 25, on the horizontal position-adjustable platform 17 located on a mid-level horizontal support member on the second side rails 12 of the support system 20. The platform 17 provides a target for the upper-extremity task of reaching and placing one or more target objects thereon and/or removing one or more target objects therefrom. Movements of the upper-extremities provide challenges to a user's balance. The further the movements are away from the user, i.e., body or torso, the greater the challenge to the user's balance. In the example of FIG. 6, if the platform 17 is re-located to the lowest most horizontal members 12C of the second side rails member 12, the user 30 has to reach lower below his waistline thereby creating an even greater challenge to the user 30 as to his balance. The ability to increase balance challenges is important to the rehabilitation process, as a particular user's balance improves over time, the position-adjustable platforms 17, 18 can be moved further away from the standing position of the user 30, continuing to challenge the user 30 throughout the rehabilitation process. Likewise, the one or more target objects may include various shapes, sizes, weights, and surface textures to adjust the grabbing ability of a particular user 30. Suitable target objects include, but are not necessarily limited to cones, bowling pins, balls or spheres, bean bags, slick objects, rings, and pegs. Although the target objects are not limited to any particular weight, suitable target objects for rehabilitation purposes may include a weight from about 56.7 grams to about 907.2 grams (about 2.0 ounces to about 32.0 ounces).

Figure 7:
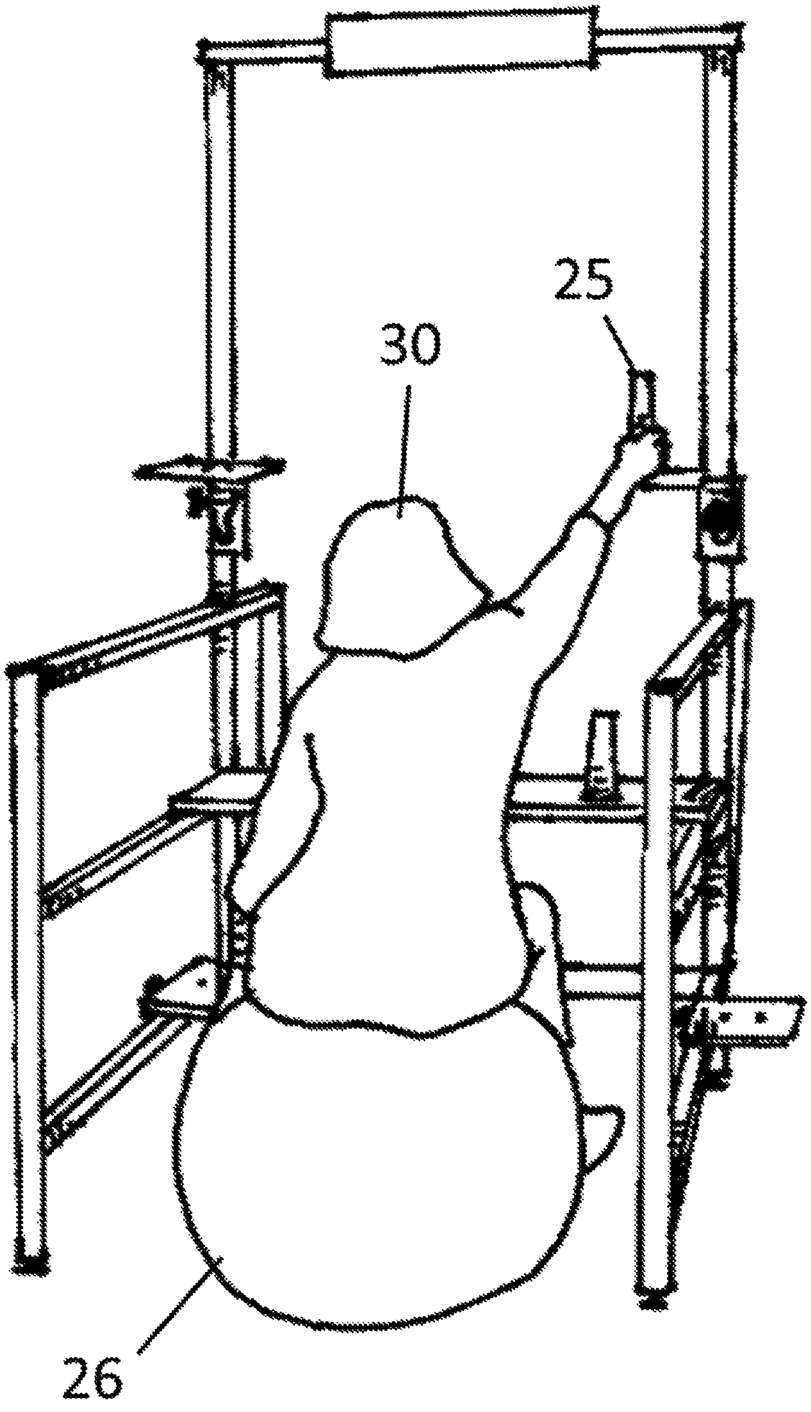
FIG. 7 illustrates another exemplary embodiment of the balance rehabilitation apparatus for upper-extremity target tasks including a user in a seated position.

An illustration of seated balance rehabilitation exercise is shown in FIG. 7, which depicts a user 30 in a seated position atop an exercise ball 26 in the workspace defined by the support system 20 facing the spanning position-adjustable platform 19. As shown, the user 30, while seated on an exercise ball, reaches with her right hand to place a cone 25 on the vertical position-adjustable platform 18 located on a right upright 13 of the support system 20. In this example, if the platform 18 is re-located to higher location on the same vertical support member, the user 30 has to reach higher in order to place and/or remove the cone 25 from the platform 18, thereby achieving an increased challenge to the user's 30 balance. As understood by persons of ordinary skill in the art of exercise and rehabilitation, an exercise ball 26 increases a person's challenge to balance by providing an unstable surface. In addition, persons may be placed within the workspace, standing or seated, facing any direction as desired or otherwise required for one or more particular tasks.

In operation, a health care professional may place one or more target objects atop one or more platforms and there after give commands to the user 30 as to which particular object or objects to grab with a particular hand and what to do with the particular object. In one embodiment, a health care professional may place one or more target objects such as coins, chips, tokens, or the like (hereafter "coin") atop one or more platforms and command the user 30 to grab a particular coin and place the coin into a particular pocket of the user 30. In another embodiment, the health care professional may place cone type objects atop the various platforms and command the user 30 to grab a particular object with a particular hand and place the object back to the same platform or to another platform of the apparatus 10. Health care professionals and/or users may implement a scoring system or other improvement mechanism for measuring balance improvement over time. For example, a health care professional may put a particular user 30 through a single balance routine over time, the balance routine being timed via a stop watch or the like. Over time, improvement may be gauged according to faster elapsed times for performing a particular routine. As a simplified example, a user 30 may initially perform a routine in ten seconds and a month later perform the same routine in 5 seconds, the improvement in elapsed time being used by the health care professional to assess balance improvement.

In one particularly advantageous embodiment, the balance rehabilitation apparatus 10 includes a support system 20 constructed of materials stiff enough to support the position-adjustable platforms and at least part of the weight of a user 30 in the event hand support is needed to prevent a user's fall. As stated above, the support system 20 may be constructed from one or more woods, fiberglass, one or more plastics, one or more metals, or other strong material, and combinations thereof. Suitably, the support system 20 is operationally configured to hold the position-adjustable platforms above the ground and although any height may be possible, preferably the support system 20 is effective to hold the position-adjustable platforms at a reaching distance from about 0.0 cm to about 213.4 cm (about 0.0 inches to about 84.0 inches) off the support surface. Although the width of the support system 20 may vary as desired, suitably the width is wide enough to accommodate a particular user 30 including a user 30 in a scooter, wheelchair or the like. Suitably, the inner width of the support system 20 is greater than about 30.5 cm but less than about 3.1 meters (greater than about 12.0 inches but less than about 10.0 feet). In one particular embodiment, the support system 20 includes an inner width from about 91.4 cm to about 121.9 cm (about 36.0 inches to about 48.0 inches).

Although the invention has been described in detail in the foregoing embodiments for the purpose of illustration, it is to be understood that such detail is solely for the purpose and that variations can be made therein by those skilled in the art without departing from the spirit and scope of the invention except as it may be described by the following claims.

I claim:

1. A balance rehabilitation apparatus including:

a support system including a three-sided framework defining a workspace for one or more persons within the three-sided framework, the three-sided framework including a first side frame assembly, a second side frame assembly and a third side frame assembly disposed between the first and second side frame assemblies; and one or more position-adjustable platforms releasably attachable to the three-sided framework;

wherein the three-sided framework provides a plurality of positions for securing the platforms thereto; and wherein one of the one or more position-adjustable platforms includes a spanning position-adjustable platform releasably connected to the first side frame assembly at a first end and releasably connected to the second side frame assembly at a second end.

2. The apparatus of claim 1 wherein each of the position-adjustable platforms are operationally configured to provide a resting support surface for one or more target objects manually handled by the one or more persons using the apparatus.

3. The apparatus of claim 1 wherein each of the position-adjustable platforms are operationally configured to be fixed along the three-sided framework at first target locales and repositioned and fixed to the three-sided framework at one or more second locales different from the first target locales, the three-sided framework being operationally configured to reposition the platforms in X, Y, and Z directions.

4. The apparatus of claim 3 wherein one or more position-adjustable platforms may extend inward into the defined workspace a distance at least about 1/13 the length of the spanning position-adjustable platform.

5. The apparatus of claim 1 wherein at least one side of the three-sided framework includes a height no less than the height of the person using the apparatus.

6. The apparatus of claim 1 wherein the position-adjustable platforms may extend inward into the defined workspace and outward away from the workspace at a plurality of points along each side of the three-sided framework.

7. The apparatus of claim 1 wherein the first side frame assembly includes one or more horizontal members, the second side frame assembly includes one or more horizontal members and the third side frame assembly includes a height that varies from the height of the first and second side frame assemblies.

8. The apparatus of claim 7 wherein the third side frame assembly includes a first upright, a second upright and a top bar releasably attachable to the first upright at a first end and releasably attachable to the second upright at a second end.

9. A method of progressively challenging a balanced impaired target person to improve his/her functional balance by having the target person perform upper-extremity target tasks via operation of an apparatus operationally configured to change the degree of challenge of the upper-extremity target tasks including:

providing the apparatus as described in claim 1;

for a target person to use the apparatus, placing the one or more position-adjustable platforms along the three-sided framework at first target locales;

placing one or more target objects atop the one or more position-adjustable platforms;

placing the target person within the workspace facing a desired direction, the torso of the person being a distance from each of the one or more position-adjustable platforms; and having the target person manually grab and move one or more target objects to and from one or more position-adjustable platforms using at least one of his/her upper extremities.

10. The method of claim 9 further including repositioning one or more of the position-adjustable platforms at second target locales along the three-sided framework at distances greater from the torso than the first target locales.

11. The method of claim 9 including placing a second person in the workspace with the target person.

12. The apparatus of claim 1 wherein the first side frame assembly and second side frame assembly each include one or more horizontal members.

13. The apparatus of claim 12 wherein the first side frame assembly and second side frame assembly each include three horizontal members.

14. The apparatus of claim 13 wherein the horizontal members are in a parallel arrangement.

15. A system for affecting the focus and degree of difficulty of one or more balance exercises to be performed by a person using upper-extremity target tasks, including:

(a) a balance rehabilitation apparatus including (1) a support system including a three-sided framework defining a workspace of a particular width for one or more persons within the workspace; and (2) one or more position-adjustable platforms including a spanning position-adjustable platform releasably attachable to the three-sided framework, wherein the three-sided framework provides a plurality of positions for securing the platforms thereto and wherein the width of the workspace is determined according to the length of the spanning position-adjustable platform; and (b) one or more target objects to rest atop the one or more position-adjustable platforms, the one or more target objects being moveable amongst one or more position-adjustable platforms.

16. The system of claim 15 wherein the three-sided framework includes a first side frame assembly, a second side frame assembly and a third side frame assembly disposed between the first and second side frame assemblies, the third side frame assembly having a first upright, a second upright, a top bar located above the spanning position-adjustable platform and a bottom bar located below the spanning position-adjustable platform.

* * * * *